United States Patent
Gadient et al.

(10) Patent No.: US 12,141,277 B2
(45) Date of Patent: Nov. 12, 2024

(54) MALWARE DETECTION SYSTEM

(71) Applicant: Vali Cyber, Inc., Charlottesville, VA (US)

(72) Inventors: Austin James Gadient, Albuquerque, NM (US); Donald Benson Reaves, Pittsford, NY (US); Anthony James Gadient, Charlottesville, VA (US)

(73) Assignee: Vali Cyber, Inc., Charlottesville, VA (US)

( * ) Notice: Subject to any disclaimer, the term of this patent is extended or adjusted under 35 U.S.C. 154(b) by 215 days.

(21) Appl. No.: 17/650,149

(22) Filed: Feb. 7, 2022

(65) Prior Publication Data

US 2022/0253524 A1    Aug. 11, 2022

Related U.S. Application Data

(60) Provisional application No. 63/146,975, filed on Feb. 8, 2021.

(51) Int. Cl.
*G06F 21/55* (2013.01)
*G06F 11/14* (2006.01)
*G06F 21/56* (2013.01)

(52) U.S. Cl.
CPC ........ *G06F 21/554* (2013.01); *G06F 11/1469* (2013.01); *G06F 21/552* (2013.01); *G06F 21/565* (2013.01); *G06F 21/566* (2013.01)

(58) Field of Classification Search
CPC .... G06F 21/545; G06F 21/552; G06F 21/565; G06F 21/566; G06F 11/1469
See application file for complete search history.

(56) References Cited

U.S. PATENT DOCUMENTS

| 8,201,253 B1 * | 6/2012 | Yan | G06F 21/51 |
| | | | 713/188 |
| 9,317,686 B1 * | 4/2016 | Ye | G06F 21/568 |

(Continued)

FOREIGN PATENT DOCUMENTS

| JP | 2017102823 | 6/2014 |
| JP | 2017527931 | 9/2017 |
| JP | 2020522808 | 7/2020 |

OTHER PUBLICATIONS

PCT International Application No. PCT/US22/15448, International Search Report and Written Opinion of the International Searching Authority, dated May 11, 2022, 12 pages.

(Continued)

*Primary Examiner* — Viet D Vu
(74) *Attorney, Agent, or Firm* — DLA Piper LLP US

(57) ABSTRACT

A behavioral monitor executing in user space generates a plurality of filters corresponding to a plurality of processes executing in the user space. A first process transmits a system call to a corresponding filter of the plurality of filters in kernel space. The first process receives a signal from the corresponding filter. The first process analyzes the arguments submitted in the system call. The first process determines that the arguments may be associated with malicious activity. The first process generates an event and transmitting the event to the behavioral monitor. The behavioral monitor analyzes the event to determine whether the event is associated with malicious activity. The behavioral monitor causes a process group associated with the first process to cease executing and restores a previous version of the at least one file modified by the process group.

17 Claims, 5 Drawing Sheets

(56) References Cited

U.S. PATENT DOCUMENTS

| | | | |
|---|---|---|---|
| 9,383,934 B1 | 7/2016 | Lukacs et al. | |
| 2014/0237596 A1* | 8/2014 | Grytsan | G06F 21/566 |
| | | | 726/23 |
| 2016/0042179 A1* | 2/2016 | Weingarten | G06F 21/56 |
| | | | 726/23 |
| 2019/0121972 A1* | 4/2019 | Norvill | G06F 21/554 |
| 2020/0110876 A1* | 4/2020 | Kwon | G06F 21/56 |
| 2020/0302058 A1 | 9/2020 | Kenyon et al. | |

OTHER PUBLICATIONS

Office Action for Japanese Patent Application No. 2023-547348, mailed Aug. 2, 2024, 3 pages.

\* cited by examiner

MALWARE DETECTION SYSTEM

CROSS-REFERENCE TO RELATED APPLICATIONS

This application claims priority to U.S. Provisional Application Ser. No. 63/146,975, filed Feb. 8, 2021, which is hereby incorporated by reference in its entirety.

FIELD OF THE DISCLOSURE

Embodiments disclosed herein generally related to a malware detection system and a method for operating the same.

BACKGROUND

Malware may be developed to infiltrate a user's computing system to possibly steal privileged information, such as, but not limited to, personal identification information or financial information. As there continues to be advances in malware detection, fraudulent actors continue to find ways to navigate around mechanisms that may be implemented to deter malicious attacks. While much of this technology has been dedicated to Windows based operating systems, there have not been many advances to Unix-like operating systems, such as Unix®/Linux®.

SUMMARY

In some embodiments, a method for detecting malicious activity is disclosed herein. A behavioral monitor executing in user space generates a plurality of filters corresponding to a plurality of processes executing in the user space. A first process of the plurality of processes transmits a system call to a corresponding filter of the plurality of filters in kernel space. The first process of the plurality of processes receives a signal from the corresponding filter. The signal prompts the first process to analyze arguments submitted in the system call. Responsive to the receiving, the first process analyzes the arguments submitted in the system call. Analyzing the arguments includes determining that at least one file and/or data has been modified by the first process or a process related to the first process. The first process determines that the arguments may be associated with malicious activity. Responsive to the determining, the first process generates an event and transmitting the event to the behavioral monitor. The behavioral monitor analyzes the event to determine whether the event is associated with malicious activity. Analyzing the event includes generating a copy of the at least one file and/or data prior to being modified by the first process and saving the copy and/or data of the at least one file to a backup folder or a system. Responsive to determining that the event is associated with malicious activity, the behavioral monitor causes a process group associated with the first process to cease executing and restores a previous version of the at least one file from the backup folder or the system.

In some embodiments, a non-transitory computer readable medium is disclosed herein. The non-transitory computer readable medium includes instructions, which, when executed by one or more processors, causes a computing system to perform operations. The operations include generating, by a behavioral monitor executing in user space, a plurality of filters corresponding to a plurality of processes executing in the user space. The operations further include transmitting, by a first process of the plurality of processes, a system call to a corresponding filter of the plurality of filters in kernel space. The operations further include receiving, by the first process of the plurality of processes, a signal from the corresponding filter. The signal prompts the first process to analyze arguments submitted in the system call. The operations further include, responsive to the receiving, analyzing, by the first process, the arguments submitted in the system call by determining that at least one file has been modified by the first process or a process related to the first process. The operations further include determining, by the first process, that the arguments may be associated with malicious activity. The operations further include responsive to the determining, generating, by the first process, an event and transmitting the event to the behavioral monitor. The operations further include analyzing, by the behavioral monitor, the event to determine whether the event is associated with malicious activity by generating a copy of the at least one file and/or data prior to being modified by the first process and saving the copy of the at least one file and/or data to a backup folder or a system. The operations further include, responsive to determining that the event is associated with malicious activity, causing, by the behavioral monitor, a process group associated with the first process to cease executing and restoring, by the behavioral monitor, a previous version of the at least one file and/or data from the backup folder or the system.

In some embodiments, a system is disclosed herein. The system includes a processor and a memory. The memory has programming instructions stored thereon, which, when executed by the processor, causes the system to perform operations. The operations include generating, by a behavioral monitor executing in user space, a plurality of filters corresponding to a plurality of processes executing in the user space. The operations further include transmitting, by a first process of the plurality of processes, a system call to a corresponding filter of the plurality of filters in kernel space. The operations further include receiving, by the first process of the plurality of processes, a signal from the corresponding filter. The signal prompts the first process to analyze arguments submitted in the system call. The operations further include, responsive to the receiving, analyzing, by the first process, the arguments submitted in the system call by determining that at least one file has been modified by the first process or a process related to the first process. The operations further include determining, by the first process, that the arguments may be associated with malicious activity. The operations further include responsive to the determining, generating, by the first process, an event and transmitting the event to the behavioral monitor. The operations further include analyzing, by the behavioral monitor, the event to determine whether the event is associated with malicious activity by generating a copy of the at least one file and/or data prior to being modified by the first process, and saving the copy of the at least one file and/or data to a backup folder or a system. The operations further include responsive to determining that the event is associated with malicious activity, causing, by the behavioral monitor, a process group associated with the first process to cease executing. The operations further include restoring, by the behavioral monitor, a previous version of the at least one file from the backup folder or the system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein are generally directed to a malware detection system. For example, one or more techniques described herein provide a means to detect malware within a Unix®/Linux® environment (e.g., Ubuntu®, Red Hat®, etc.). In order to detect malicious activity, the one or more techniques described herein may utilize a behavioral monitor that is configured to inject process code into various processes executing in user space of the computing environment. Such injection of process code may trigger the generation of corresponding filters in a kernel space of the computing system. The filters in the kernel space may be used to intercept system calls from associated processes to identify certain system calls that may be associated with malicious activity. If the present system determines that one or more processes or files are associated with malicious activity, the behavioral monitor may kill execution of the process and restore previous versions of the processes or files from backup.

Figure 1:
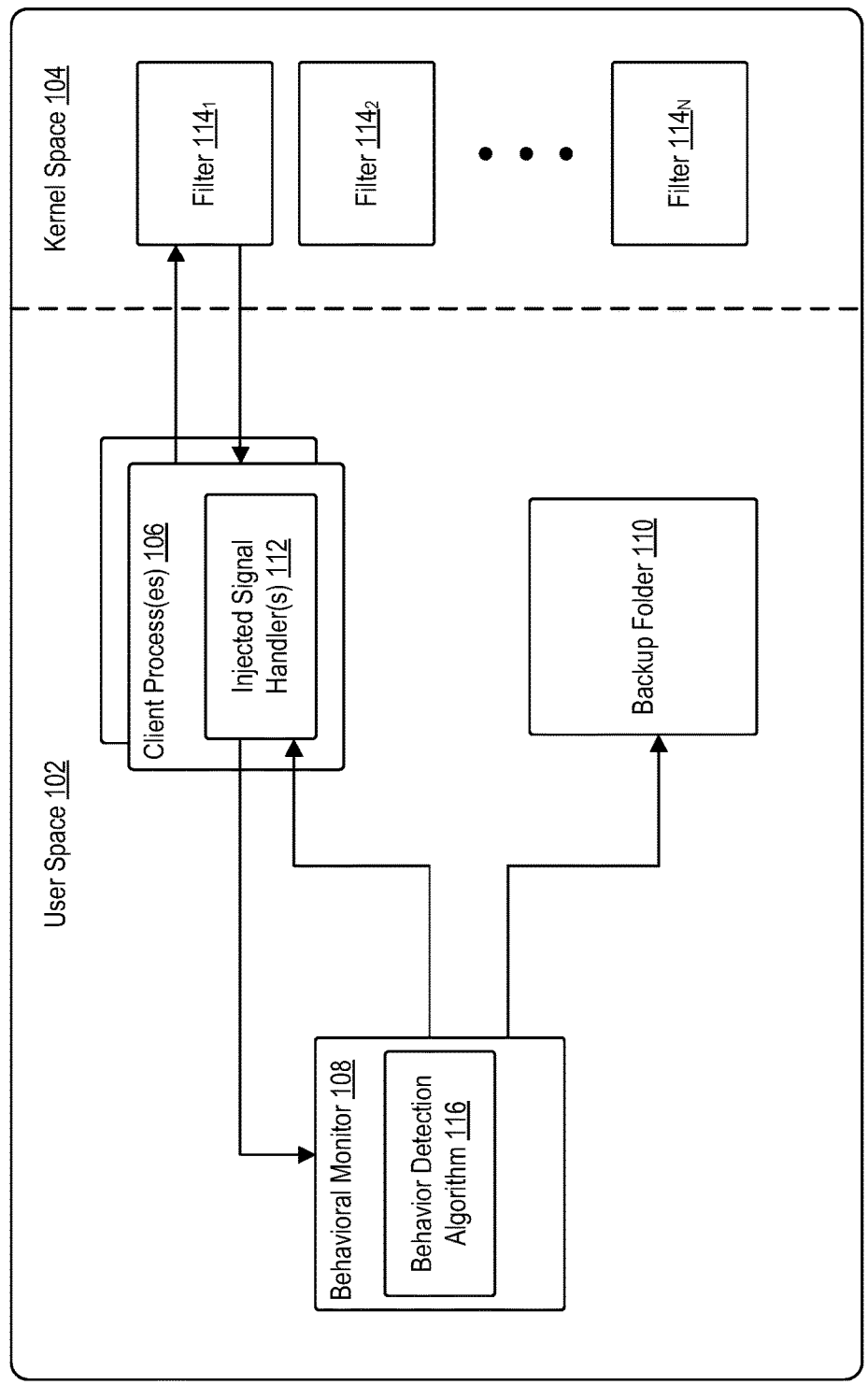
FIG. 1 is a block diagram illustrating a computing system, according to example embodiments.

FIG. 1 is a block diagram illustrating a computing system 100, according to example embodiments. In some embodiments, computing system 100 may be representative of a server system that is configured to perform the operations discussed here. In other embodiments, computing system 100 may be representative of an IOT device or appliance. As shown, computing system 100 may include a user space 102 and a kernel space 104. User space 102 and kernel space 104 may be representative of portions of memory associated with computing system 100.

Generally, user space 102 may be representative of a portion of memory that executes code outside of the operating system's kernel. For example, user space 102 may be representative of a portion of memory that is configured to execute applications in computing system 100. In comparison, kernel space 104 may be representative of a portion of memory that executes an operating system kernel associated with computing system 100. For example, kernel space 104 may be representative of a portion of memory associated with the kernel and operating system.

As shown, user space 102 may include one or more client processes 106 (generally, client process 106), a behavioral monitor 108, and a backup folder 110. In some embodiments, each of client processes 106 and behavioral monitor 108 may be comprised of one or more software modules. The one or more software modules may be collections of code or instructions stored in user space 102 that represent a series of machine instructions (e.g., program code) that implements one or more algorithmic steps. Such machine instructions may be the actual computer code the processor of computing system 100 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

In some embodiments, client processes 106 may refer to a program executing in computing system 100. In some embodiments, client processes 106 may be representative of a program executing in a container solution, such as Docker®, CRI-O, and the like. Generally, programs executing inside a container may show up as individual programs in computing system 100. For purposes of computing system 100, there is no difference between a process executing inside a container and any other process. In some embodiments, client process 106 may be representative of a program executing in a virtual machine.

Behavioral monitor 108 may be configured to detect malware on computing system 100. In some embodiments, to initiate monitoring of every process on computing system 100, every program on computing system 100, other than behavioral monitor 108, may be paused. In some embodiments, a subset of every process on computing system 100 may be paused. Once the programs are paused, behavioral monitor 108 may begin injecting processing code into each program. By first pausing every process on the system, behavioral monitor 108 may inject processing code into all programs and threads without concern for race conditions where programs and threads are being newly created as behavioral monitor 108 attempts to inject into all programs and threads. Further injecting processing code into every process 106, behavioral monitor 108 may be configured to receive event information from the injected code. To inject processing code into every process 106, behavioral monitor 108 may use a system call. In some embodiments, the system call may be a ptrace or process_vm_writev system call. The ptrace system call may allow behavioral monitor 108 to attach to or control various processes 106. The process_vm_writev system call may allow behavioral monitor 108 to inject processing code into every process 106.

In some embodiments, after a process is injected, the process may create new programs or threads in the target process. Generally, there may be multiple ways in which a process and/or a thread can be created in computing system 100. For example, a user or administrator may utilize one or more of clone, fork, or vfork system calls to create a new program or thread.

In some embodiments, an execve and/or execveat system call may be used to create a process within a target process 106 or program. The execve and/or execveat system call may completely overwrite the original memory in an address space of process 106, thereby creating a new program within process 106. Once executed, behavioral monitor 108 may reinject the processing code into the newly created program, as if it were any other program.

In some embodiments, a fork and/or vfork system call(s) may be used to create a program within a target process 106 or program. In some embodiments, fork and/or vfork and/or clone system call(s) may create a program whose memory image may be a copy of the process that called the fork. In some embodiments, execution may be resumed directly after the location of the fork call. In some embodiments, the injected processing code may cause the fork and/or vfork system call(s) to be initiated at a different location that was originally intended by the program. As such, the newly created program's context may be set to be consistent with the originally intended location of the fork and/or vfork system call(s). In some embodiments, the context may include the registers and the state of the originally intended execution.

In some embodiments, this may be achieved by injecting a setcontext function into a newly created program and executing the setcontext function in the newly created program. Setcontext may receive, as an argument, the desired new context. In some embodiments, behavioral monitor 108 may create a desired new context and may provide the desired new context, as an argument, to the newly injected setcontext function.

In some embodiments, this may be achieved by executing a sigreturn system call into a new created program and executing the sigreturn system call in the newly created program.

In some embodiments, a clone system call may be used to create a thread within a target process 106 or program. In some embodiments, clone system call may act similarly to the fork system call described above. As such, the clone system call may be handled similarly to the fork system call. In some embodiments, rather than creating a new program within process 106, the clone system call may create a new thread within process 106. Similar to the fork system call, execution of the new thread may be started directly after the original call to clone. Because this system call may happen in the injected processing code and not the originally intended location, the context of the new thread must be properly set in order to be consistent with the originally intended context.

In some embodiments, behavioral monitor 108 may inject code in such a way that it does not damage the state of a process 106 executing on computing system 100. For example, in operation, before a program is injected within a given process 106, portions of the original state of process 106 that are about to be modified may be stored. Once the portions of the original state of process 106 are stored, behavioral monitor 108 may begin injection of the code into process 106. Once the injection occurs, behavioral monitor 108 may restore the portions of the original state that were stored, along with the injected code.

In some embodiments, once the injection occurs and the portions of the original state of a respective process 106 are restored, copies of the files and/or data that process 106 modifies or deletes may be created and stored in backup folder 110. In some embodiments, behavioral monitor 108 may utilize a system call to copy these files and/or data to backup folder 110. For example, behavioral monitor 108 may utilize a copy_file_range system call to copy files and/or data to backup folder 110.

In some embodiments, behavioral monitor 108 may use a combination of any system call that can access, read, and write data to copy files to backup folder 110.

In some embodiments, once the injection occurs and the portions of the original state of a respective process 106 are restored, copies of the files and/or data that process 106 modifies or deletes may be created and stored in any system that may store data such as a database, network attached storage, or alternate machine.

In some embodiments, the injected code may rely on a secomp filter to establish a filter for system calls that may be of interest. As shown, although the secomp filters may be created in user space, a corresponding filter 114 may be established in kernel space 104. In this manner, computing system 100 does not need a kernel module in order to carry out this process. A secomp filter may provide a means for a process to specify a filter 114 for incoming system calls. In some embodiments, secomp filter may take the form of a Berkeley Packet Filter (BPF) program. Examples of system calls that may be of interest include, but are not limited to, those system calls associated with file operations, system calls associated with creating new programs, system calls related to the initiation of network connections, and the like. For example, system calls such as open and openat may be captures to track the files a given process is accessing. Additionally, system calls such as execve, fork, and clone may be captured to track the creation of new threads, processes, and process groups. System calls such as accept4, accept, bind, and connect may be used to capture network connection initiation.

In some embodiments, behavioral monitor 108 may use auditd rules to establish a filter for system calls that may be of interest.

In some embodiments, behavioral monitor 108 may use fanotify to establish a filter for system calls that may be of interest.

In some embodiments, behavioral monitor 108 may use extended Berkely Packet Filters (eBPF) to establish a filter for system calls that may be of interest.

In some embodiments, behavioral monitor 108 may use a system call prtctl with an argument PR_SET_SYSCALL_USER_DISPATCH to establish a filter for system calls that may be of interest.

In some embodiments, behavioral monitor 108 may use an SELinux module to establish a filter for system calls that may be of interest.

In some embodiments, behavioral monitor 108 may use an AppArmour profile to establish a filter for system calls that may be of interest.

In some embodiments, behavioral monitor 108 may use a system call ptrace to establish a filter for system calls that may be of interest.

In some embodiments, the injected code may register or establish a signal handler 112 in each process. Signal handler 112 may be configured to handle signals received from kernel space 104. For example, signal handler 112 may be configured to handle a SIGSYS signal transmitted from a corresponding filter 114 in kernel space 104. In some embodiments, upon receiving a SIGSYS signal, signal handler 112 may obtain relevant information from the signal and perform one or more actions based on the specific type of system call. For example, in operation, a client process 106 may either open a file and/or data with the intent to modify that file and/or data or may delete that file and/or data. Such operation may trigger signal handler 112 to send data about the file and/or data being accessed to behavioral monitor 108. Behavioral monitor 108 may make a copy of the file and/or data and may store the file and/or data in backup folder 110. In some embodiments, behavioral monitor 108 may make a copy of the file and/or data and may store the file and/or data in any system that may store data such as a database, network attached storage, or alternate machine.

Referring to kernel space 104, as shown, kernel space 104 may include one or more filters 114$_1$-114$_n$ (generally, filter 114 or filters 114) established therein. Each filter 114 may correspond to a respective process 106, in which behavioral monitor 108 has injected code. For example, as previously mentioned, injecting code within a respective process 106 may cause the registering or establishing of a respective filter 114 in kernel space 104. Each filter 114 may define one or more rules based on a system call received from a respective process 106. For example, depending on the system call type received from process 106, filter 114 may choose to kill process 106, allow process 106 to complete, or send a SIGSYS signal back to process 106. Examples of system calls that would generate a SIGSYS signal include all those system calls which may be intercepted. Examples may include, but are not limited to, include system calls that operate on files, system calls that create new programs, system calls that modify existing programs, system calls that initiate network connections, and the like.

In some embodiments, the sending of the SIGSYS signal back to process 106 may prompt or cause signal handler 112 to execute. The SIGSYS signal may indicate to signal handler 112 that process 106 took some action. Exemplary actions may include, but are not limited to, opening a file, saving a file, requesting access to a file, and the like. Signal handler 112 may be configured to inspect the system call arguments that were sent to filter 114 to ensure that the arguments are safe. In some embodiments, signal handler 112 may allow the system call to proceed based on a determination that the arguments are sufficiently safe. Examples of system calls that may be disallowed include, but are not limited to, system calls that access protected programs or files. Determination of safety differs per system call and depend on the type of argument or arguments provided to the system call. In some embodiments, system calls whose execution may be used to determine malicious activity when considered alongside the execution of other system calls may be sent back to the monitoring program for aggregation and further analysis. In some embodiments, signal handler 112 may send a message to behavioral monitor 108, notifying behavioral monitor 108 of the system call.

Behavioral monitor 108 may be further configured to receive one or more events from signal handlers 112. In some embodiments, one or more events may refer to the messages sent from signal handler 112 to behavioral monitor 108 that notify behavioral monitor 108 of a system call that triggered a SIGSYS signal from filter 114. In some embodiments, behavioral monitor 108 may collect event information from signal handlers 112 and group them in accordance to the process group that triggered each event. Generally, a process group may refer to a collection of processes that share a child/parent relationship. In some embodiments, the events initiated by each process 106 in a group may be grouped together as if they were initiated by the same process. Behavioral monitor 108 may then analyze and evaluate the process group data using a behavior detection algorithm 116. Behavior detection algorithm 116 may be configured to analyze the process group data to determine whether the process group itself is malicious. If behavior detection algorithm 116 determines that the process group is malicious, behavioral monitor may initiate a kill of the malicious process group.

In some embodiments, behavioral detection algorithm 116 may be configured to maintain counts and relationships between system calls that a process group executes inside of behavioral monitor 108. Such configuration provides an improvement over storing an entirety of the information about the original system call for a variety of reasons. For example, behavioral detection algorithm 116 may be configured to aggregate system call information into a summarized form. By aggregating the system call information into a summarized form, the memory overhead of computing system 100 may be greatly reduced. Additionally, such aggregation may also significantly reduce the analysis time required to inspect the data structure that may represent a process group. For example, if a process opens thousands of files, behavioral detection algorithm 116 may store a count representing the number of files opened instead of detailed information about the specific thousands of system calls. Still further, behavioral detection algorithm 116 may also keep track of how operations occur and may keep counts relating to those facts. For example, if 500 files are opened for writing and 500 files are opened for reading, behavioral detection algorithm 116 may maintain the counts for the different types of file accesses rather than detailed information about the individual accesses. In some embodiments, the behavioral algorithm may be represented as data, rather than code, to allow it to be updated without modifying code.

In some embodiments, responsive to determining that the process group is malicious, behavioral monitor 108 may kill the entire process group associated with the malicious behavior. Because a copy of each file and/or data was generated and stored in backup folder 110 or any system that may store data such as a database, network attached storage, or alternate machine, behavioral monitor 108 may be configured to delete files and/or data dropped by the malicious process group and restore files and/or data that were previously modified by the malicious process group.

Figure 2A:
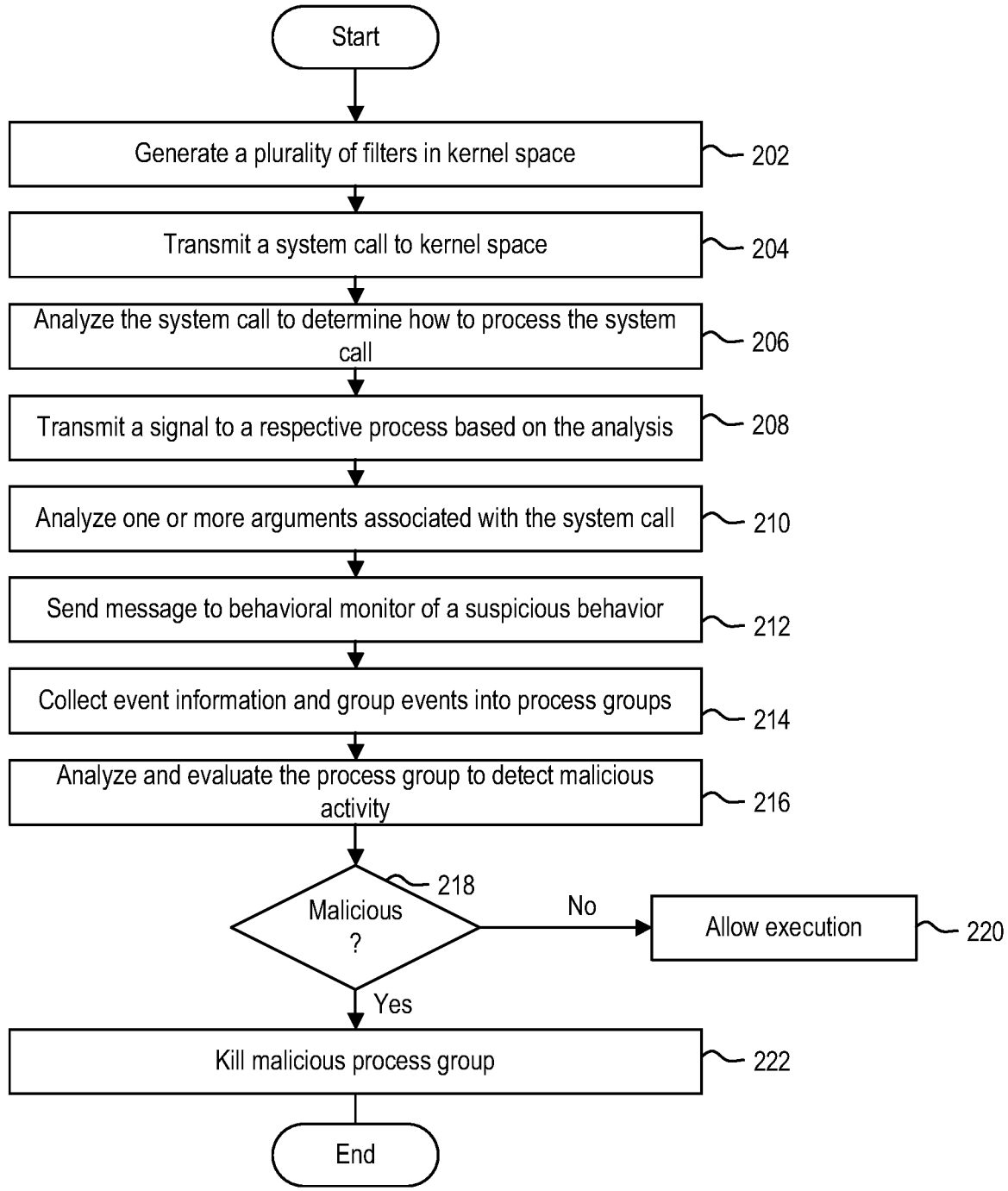
FIG. 2A is a flow diagram illustrating a method of detecting malware, according to example embodiments.

FIG. 2A is a flow diagram illustrating a method 200 of detecting malware, according to example embodiments. Method 200 may begin at step 202.

At step 202, behavioral monitor 108 may generate a plurality of filters 114 in kernel space 104 corresponding to a plurality of processes executing in user space 102. To generate plurality of filters 114, behavioral monitor 108 may inject processing code into every process 106 executing on computing system 100. Such process may result in the generation of a plurality of filters 114 in kernel space 104. In some embodiments, each filter 114 may correspond to a respective process 106 executing in user space 102.

At step 204, a process 106 may transmit a system call to kernel space 104. In some embodiments, the system call may include one or more arguments associated therewith. Exemplary system calls may include, but are not limited to, those system calls associated with file operations and those system calls associated with creating new programs. In some embodiments, the system call may be intercepted by a respective filter 114 associated with the process 106 that initiated the system call.

At step 206, filter 114 may analyze the system call to determine how to process the system call. For example, depending on the system call type received from process 106, filter 114 may choose to kill process 106, allow process 106 to complete, or send a SIGSYS signal back to process 106.

At step 208, filter 114 may transmit a signal to process 106, based on the analysis. For example, responsive to analyzing the system call received from process 106, filter 114 may generate a SIGSYS signal to send back to process 106. The SIGSYS signal may prompt process 106 to further analyze the arguments submitted in the system call.

At step 210, process 106 may receive the signal from filter 114 and analyze the argument or arguments in the associated system call. For example, signal handler 112 may inspect the system call argument or arguments that were sent to filter 114 to ensure that the argument or arguments are safe. In some embodiments, signal handler 112 may allow the system call to proceed based on a determination that the argument or arguments are sufficiently safe. In some embodiments, signal handler 112 may send a message to behavioral monitor 108, notifying behavioral monitor 108 of the system call.

At step 212, process 106 may send a message to behavioral monitor 108. For example, signal handler 112, responsive to analyzing the arguments in the system call, may send a message to behavioral monitor 108 that notifies behavioral monitor 108 of a suspicious system call.

At step 214, behavioral monitor 108 may collect event information (e.g., messages) from signal handlers 112 and group them in accordance to the process group that triggered each event. Generally, a process group may refer to a collection of processes that share a child/parent relationships. In some embodiments, the events initiated by each process 106 in a group may be grouped together as if they were initiated by the same process.

At step 216, behavioral monitor 108 may analyze and evaluate the process group data using a behavior detection algorithm 116. Behavior detection algorithm 116 may be configured to analyze the process group data to determine whether the process group itself is malicious.

At step 218, behavioral monitor 108 may determine whether the process group is malicious. If at step 218, behavioral monitor 108 determines that the process group is not malicious, then at step 220, behavioral monitor may allow the process group to continue executing. If, however, at step 218, behavioral monitor 108 determines that the process group is malicious, then at step 222 behavioral monitor may kill the malicious process group.

Figure 2B:
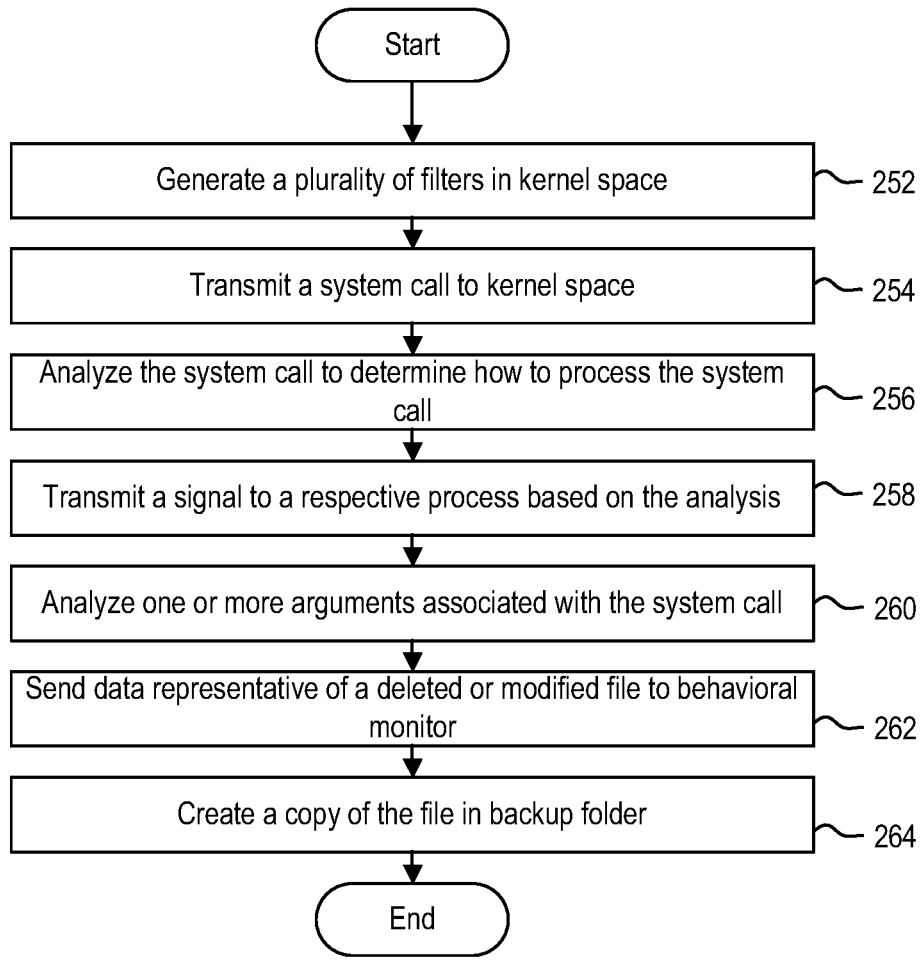
FIG. 2B is a flow diagram illustrating a method of monitoring processes executing in user space, according to example embodiments.

FIG. 2B is a flow diagram illustrating a method 250 of monitoring processes executing within a user space, according to example embodiments. Method 250 may begin as step 252.

At step 252, behavioral monitor 108 may generate a plurality of filters 114 in kernel space 104 corresponding to a plurality of processes executing in user space 102. To generate plurality of filters 114, behavioral monitor 108 may inject processing code into every process 106 executing on computing system 100. Such process may result in the generation of a plurality of filters 114 in kernel space 104. In some embodiments, each filter 114 may correspond to a respective process 106 executing in user space 102.

At step 254, a process 106 may transmit a system call to kernel space 104. In some embodiments, the system call may include one or more arguments associated therewith. Exemplary system calls may include, but are not limited to, those system calls associated with file operations and those system calls associated with creating new programs. In some embodiments, the system call may be intercepted by a respective filter 114 associated with the process 106 that initiated the system call.

At step 256, filter 114 may analyze the system call to determine how to process the system call. For example, depending on the system call type received from process 106, filter 114 may choose to kill process 106, allow process 106 to complete, or send a SIGSYS signal back to process 106.

At step 258, filter 114 may transmit a signal to process 106, based on the analysis. For example, responsive to analyzing the system call received from process 106, filter 114 may generate a SIGSYS signal to send back to process 106. The SIGSYS signal may prompt process 106 to further analyze the arguments submitted in the system call.

At step 260, process 106 may receive the signal from filter 114 and analyze the argument or arguments in the associated system call. For example, signal handler 112 may inspect the system call argument or arguments that were sent to filter 114 to determine whether process 106 has deleted or modified a file.

At step 262, responsive to signal handler 112 determining that process 106 has deleted or modified a file and/or data, signal handler 112 may send data to behavioral monitor 108. The data may be representative of an indication of process 106 modifying or deleting an existing file and/or data.

At step 264, responsive to behavioral monitor 108 receiving an indication that process 106 has deleted or modified a file and/or data, behavioral monitor 108 may create a copy of the file and/or data in backup folder 110. The copy of the file may be representative of a version of the file and/or data before modification or deletion. In this manner, behavioral monitor 108 can restore the file and/or data to its original state if it is damaged or deleted by a malicious process.

Figure 3:
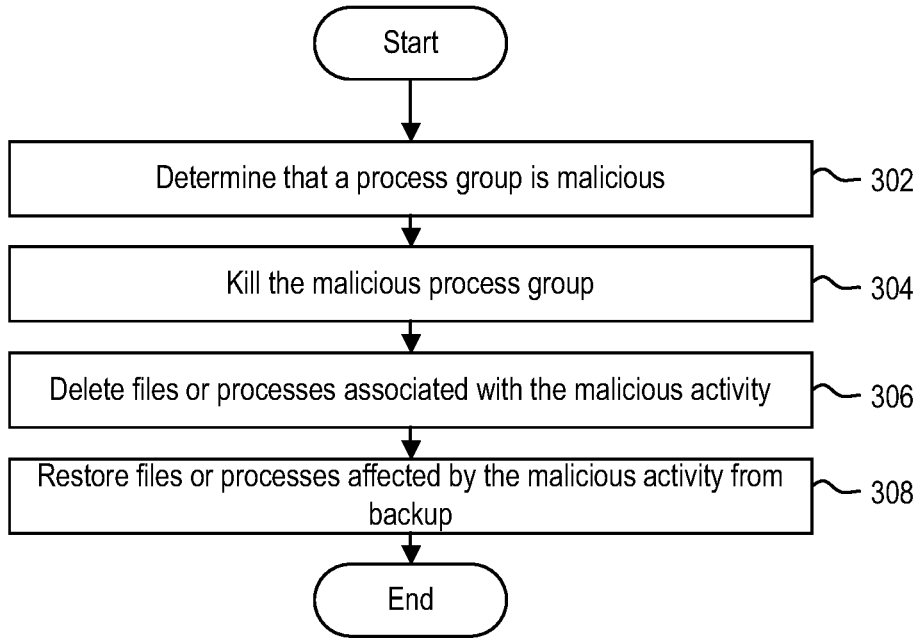
FIG. 3 is a flow diagram illustrating a method of taking remedial action when malicious activity is detected, according to example embodiments.

FIG. 3 is a flow diagram illustrating a method 300 of taking remedial action when malicious activity is detected, according to example embodiments.

As previously discussed, once injection occurs and the portions of the original state of a respective process 106 are restored, behavioral monitor 108 may cause computing system 100 to generate a copy of files and/or data that process 106, or any child processes of process 106, have modified or deleted. Such functionality allows behavioral monitor to restore the files and/or data to their original state if they are damaged or deleted. In some embodiments, behavioral monitor 108 may utilize a system call referred to as copy_file_range to copy files or processes 106 into backup folder 110. In some embodiments, backup folder 110 may further include previous versions of files or processes 106 executing in user space 102.

At step 302, behavioral monitor 108 may determine that a process group is malicious. For example, behavioral monitor 108 may analyze and evaluate process group data transmitted by one or more signal handlers 112 using a behavior detection algorithm 116. Behavior detection algorithm 116 may be configured to analyze the process group data to determine whether the process group itself is malicious.

At step 304, responsive to determining that the process group is malicious, behavioral monitor 108 may kill the malicious process group. For example, behavioral monitor 108 may transmit a signal to process 106 that may cause process 106 to cease operating. In some embodiments, the signal to process 106 may take the form of a kill command.

At step 306, behavioral monitor 108 may delete files or processes associated with the malicious activity. For example, based on the analyzing, behavioral monitor 108 may be able to identify a plurality of processes or a plurality of files that are associated with the malicious behavior. Based on this determination, behavioral monitor 108 may delete the files and/or data or processes that are identified.

At step 308, behavioral monitor 108 may restore files and/or data affected by the malicious activity. For example, responsive to identifying those files and/or data that are associated with malicious activity, behavioral monitor 108 may identify previous versions of files and or/data that may have been previously stored in backup folder 110. Behavioral monitor 108 may then overwrite or initiate restoration of a file and/or data based on a previously stored version.

Figure 4A:
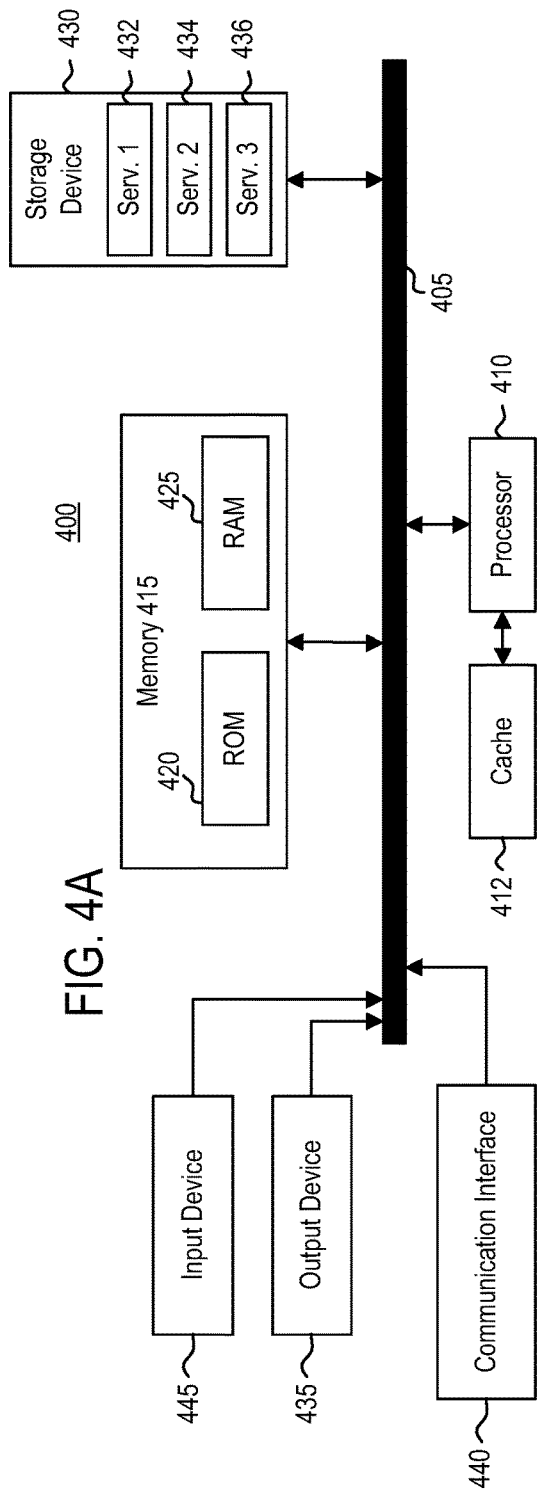
FIG. 4A illustrates a system bus computing system architecture, according to example embodiments.

FIG. 4A illustrates a system bus architecture of computing system 400, according to example embodiments. One or more components of system 400 may be in electrical communication with each other using a bus 405. System 400 may include a processor (e.g., one or more CPUs, GPUs or other types of processors) 410 and a system bus 405 that couples various system components including the system memory 415, such as read only memory (ROM) 420 and random access memory (RAM) 425, to processor 410. System 400 can include a cache of high-speed memory connected directly with, in close proximity to, or integrated as part of processor 410. System 400 can copy data from memory 415 and/or storage device 430 to cache 412 for quick access by processor 410. In this way, cache 412 may provide a performance boost that avoids processor 410 delays while waiting for data. These and other modules can control or be configured to control processor 410 to perform various actions. Other system memory 415 may be available for use as well. Memory 415 may include multiple different types of memory with different performance characteristics. Processor 410 may be representative of a single processor or multiple processors. Processor 410 can include one or more of a general purpose processor or a hardware module or software module, such as service 1 432, service 2 434, and service 4 436 stored in storage device 430, configured to control processor 410, as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the computing system 400, an input device 445 which can be any number of input mechanisms, such as a microphone for speech, a touch-sensitive screen for gesture or graphical input, keyboard, mouse, motion input, speech and so forth. An output device 435 (e.g., display) can also be one or more of a number of output mechanisms known to those of skill in the art. In some instances, multimodal systems can enable a user to provide multiple types of input to communicate with computing system 400. Communications interface 440 can generally govern and manage the user input and system output. There is no restriction on operating on any particular hardware arrangement and therefore the basic features here may easily be substituted for improved hardware or firmware arrangements as they are developed.

Storage device 430 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 can include services 432, 434, and 436 for controlling the processor 410. Other hardware or software modules are contemplated. Storage device 430 can be connected to system bus 405. In one aspect, a hardware module that performs a particular function can include the software component stored in a computer-readable medium in connection with the necessary hardware components, such as processor 410, bus 405, output device 435, and so forth, to carry out the function.

Figure 4B:
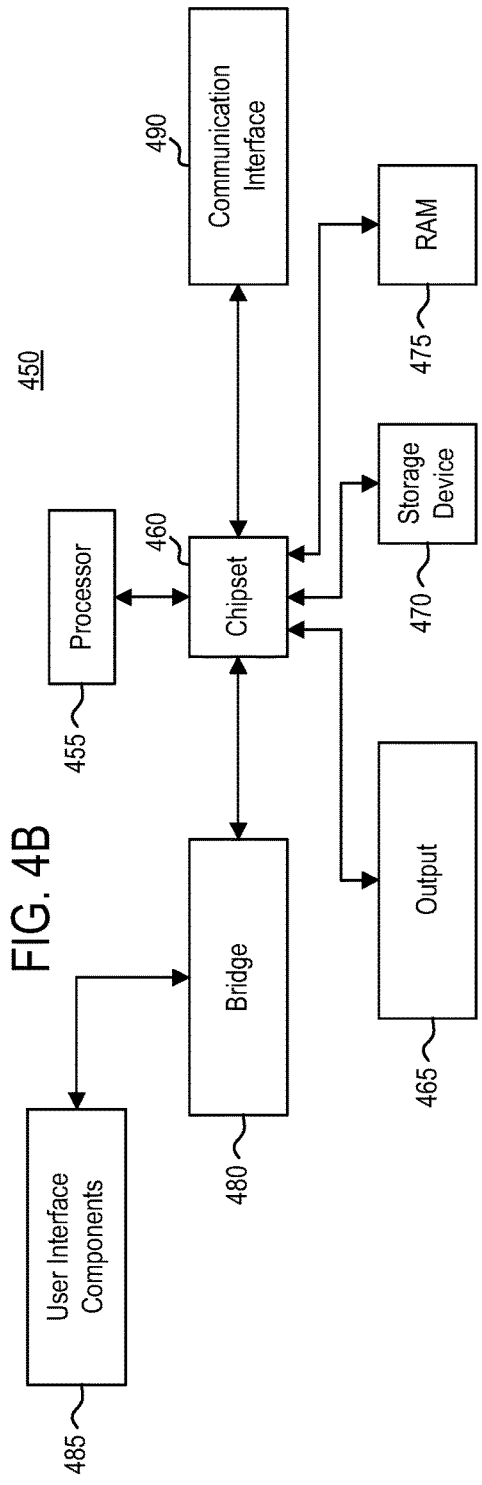
FIG. 4B illustrates a computer system having a chipset architecture, according to example embodiments.

FIG. 4B illustrates a computer system 450 having a chipset architecture, according to example embodiments. Computer system 450 may be an example of computer hardware, software, and firmware that can be used to implement the disclosed technology. System 450 can include one or more processors 455, representative of any number of physically and/or logically distinct resources capable of executing software, firmware, and hardware configured to perform identified computations. One or more processors 455 can communicate with a chipset 460 that can control input to and output from one or more processors 455. In this example, chipset 460 outputs information to output 465, such as a display, and can read and write information to storage device 470, which can include magnetic media, and solid-state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 455 analyzing data stored in storage device 470 or RAM 475. Further, the machine can receive inputs from a user through user interface components 485 and execute appropriate functions, such as browsing functions by interpreting these inputs using one or more processors 455.

It can be appreciated that example systems 400 and 450 can have more than one processor 410 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method for detecting malicious activity in a computing system comprising a user space and a kernel space, the method comprising:
generating, by a behavioral monitor executing in the user space, a plurality of filters in the kernel space, the plurality of filters corresponding to a plurality of processes executing in the user space, the plurality of filters generated by injecting code into the plurality of processes executing in the user space, the code creating signal handlers for each process;
transmitting, by a first process of the plurality of processes, a system call to the kernel space;
intercepting, by a first filter of the plurality of filters, the system call, wherein the first filter in the kernel space was created in association with the first process;
analyzing, by the first filter, the system call to determine how to process the system call based on one or more predefined rules stored at the first filter;
based on the analyzing, sending, by the first filter, a signal to a first signal handler associated with the first process, the signal prompting the first process to analyze arguments submitted in the system call;
responsive to receiving the signal from the first filter, analyzing, by the first process, the arguments submitted in the system call, wherein analyzing the arguments comprises:
determining that the first process or a process related to the first process has modified at least one file and/or data;
determining, by the first process, that the arguments may be associated with malicious activity;
responsive to the determining, generating, by the first process, an event and transmitting the event to the behavioral monitor, the event indicating that the first process has modified at least one file and/or data;
analyzing, by the behavioral monitor, the event to determine whether the event is associated with malicious activity, wherein analyzing the event comprises:
generating a copy of the at least one file and/or data prior to being modified by the first process, and
saving the copy and/or data of the at least one file to a backup folder or a system;
responsive to determining that the event is associated with malicious activity,
causing, by the behavioral monitor, a process group associated with the first process to cease executing, and
restoring, by the behavioral monitor, a previous version of the at least one file from the backup folder or the system.

2. The method of claim 1, further comprising:
saving, by the behavioral monitor, copies of files and/or data that the first process has modified.

3. The method of claim 1, further comprising:
saving, by the behavioral monitor, copies of files and/or data that the first process has deleted.

4. The method of claim 1, wherein injecting the code into the first process comprises:
overwriting at least a first portion of code associated with the first process; and
after the corresponding filter is generated in the kernel space, restoring the first portion of the code.

5. The method of claim 1, wherein the first process is executing in a container.

6. The method of claim 1, wherein the process group is a collection of processes that share a child/parent relationships.

7. A non-transitory computer readable medium comprising instructions which, when executed by one or more processors, causes a computing system to perform operations, comprising:
generating, by a behavioral monitor executing in a user space of a computing system comprising the user space and a kernel space, a plurality of filters in the kernel space, the plurality of filters corresponding to a plurality of processes executing in the user space, the plurality of filters generated by injecting code into the plurality of processes executing in the user space, the code creating signal handlers for each process;
transmitting, by a first process of the plurality of processes, a system call to the kernel space;
intercepting, by a first filter of the plurality of filters, the system call, wherein the first filter in the kernel space was created in association with the first process;
analyzing, by the first filter, the system call to determine how to process the system call based on one or more predefined rules stored at the first filter;
based on the analyzing, sending, by the first filter, a signal to a first signal handler associated with the first process, the signal prompting the first process to analyze arguments submitted in the system call;
responsive to receiving the signal from the first filter, analyzing, by the first process, the arguments submitted in the system call, wherein analyzing the arguments comprises:
determining that the first process or a process related to the first process has modified at least one file and/or data;
determining, by the first process, that the arguments may be associated with malicious activity;
responsive to the determining, generating, by the first process, an event and transmitting the event to the behavioral monitor, the event indicating that the first process has modified at least one file and/or data;
analyzing, by the behavioral monitor, the event to determine whether the event is associated with malicious activity, wherein analyzing the event comprises:
generating a copy of the at least one file and/or data prior to being modified by the first process, and
saving the copy of the at least one file and/or data to a backup folder or a system;
responsive to determining that the event is associated with malicious activity,
causing, by the behavioral monitor, a process group associated with the first process to cease executing, and
restoring, by the behavioral monitor, a previous version of the at least one file and/or data from the backup folder or the system.

8. The non-transitory computer readable medium of claim 7, further comprising:
saving, by the behavioral monitor, copies of files and/or data that the first process has modified.

9. The non-transitory computer readable medium of claim 7, further comprising:
saving, by the behavioral monitor, copies of files and/or data that the first process has deleted.

10. The non-transitory computer readable medium of claim 7, wherein the first process is executing in a container.

11. The non-transitory computer readable medium of claim 7, wherein injecting the code into the first process comprises:
   overwriting at least a first portion of code associated with the first process; and
   after the corresponding filter is generated in the kernel space, restoring the first portion of the code.

12. The non-transitory computer readable medium of claim 7, wherein the process group is a collection of processes that share a child/parent relationships.

13. A system comprising a user space and a kernel space, the system, comprising:
   a processor; and
   a memory having programming instructions stored thereon, which, when executed by the processor, causes the system to perform operations, comprising:
      generating, by a behavioral monitor executing in the user space, a plurality of filters in the kernel space, the plurality of filters corresponding to a plurality of processes executing in the user space, the plurality of filters generated by injecting code into the plurality of processes executing in the user space, the code creating signal handlers for each process;
      transmitting, by a first process of the plurality of processes, a system call to the kernel space;
      intercepting, by a first filter of the plurality of filters, the system call, wherein the first filter in the kernel space was created in association with the first process;
      analyzing, by the first filter, the system call to determine how to process the system call based on one or more predefined rules stored at the first filter;
      based on the analyzing, sending, by the first filter, a signal to a first signal handler associated with the first process, the signal prompting the first process to analyze arguments submitted in the system call;
      responsive to receiving the signal from the first filter, analyzing, by the first process, the arguments submitted in the system call, wherein analyzing the arguments comprises:
         determining that the first process or a process related to the first process has modified at least one file and/or data;
      determining, by the first process, that the arguments may be associated with malicious activity;
      responsive to the determining, generating, by the first process, an event and transmitting the event to the behavioral monitor, the event indicating that the first process has modified at least one file and/or data;
      analyzing, by the behavioral monitor, the event to determine whether the event is associated with malicious activity, wherein analyzing the event comprises:
         generating a copy of the at least one file and/or data prior to being modified by the first process, and
         saving the copy of the at least one file and/or data to a backup folder or a system;
      responsive to determining that the event is associated with malicious activity, causing, by the behavioral monitor, a process group associated with the first process to cease executing; and
      restoring, by the behavioral monitor, a previous version of the at least one file from the backup folder or the system.

14. The system of claim 13, wherein the operations further comprise:
   saving, by the behavioral monitor, copies of files that the first process has modified.

15. The system of claim 14, wherein the operations further comprise:
   saving, by the behavioral monitor, copies of files and/or data that the first process has deleted.

16. The system of claim 13, wherein the first process is executing in a container.

17. The system of claim 13, wherein injecting the code into the first process comprises:
   overwriting at least a first portion of code associated with the first process; and
   after the corresponding filter is generated in the kernel space, restoring the first portion of the code.

* * * * *